United States Patent
Wang et al.

(10) Patent No.: US 9,286,718 B2
(45) Date of Patent: Mar. 15, 2016

(54) METHOD USING 3D GEOMETRY DATA FOR VIRTUAL REALITY IMAGE PRESENTATION AND CONTROL IN 3D SPACE

(71) Applicant: Ortery Technologies, Inc., New Taipei (TW)

(72) Inventors: Douglas Wei-Ming Wang, Seattle, WA (US); Peng-Cheng Lai, Los Altos, CA (US)

(73) Assignee: ORTERY TECHNOLOGIES, INC., Irvine, CA (US)

( * ) Notice: Subject to any disclaimer, the term of this patent is extended or adjusted under 35 U.S.C. 154(b) by 118 days.

(21) Appl. No.: 14/039,814

(22) Filed: Sep. 27, 2013

(65) Prior Publication Data

US 2015/0091905 A1 Apr. 2, 2015

(51) Int. Cl.
- *G06T 15/00* (2011.01)
- *G06T 17/00* (2006.01)
- *G06T 7/00* (2006.01)

(52) U.S. Cl.
CPC ............... *G06T 17/00* (2013.01); *G06T 7/0024* (2013.01); *G06T 2207/10028* (2013.01)

(58) Field of Classification Search
CPC ....... G06T 13/40; G06T 15/005; G06T 17/00; G06T 7/0024; G06T 2207/10028
USPC ......... 345/419, 581, 582, 473, 474, 475, 154; 382/154
See application file for complete search history.

(56) References Cited

U.S. PATENT DOCUMENTS

| | | | | |
|---|---|---|---|---|
| 6,084,979 A * | 7/2000 | Kanade et al. | | 382/154 |
| 6,529,192 B1 * | 3/2003 | Waupotitsch | | 345/419 |
| 6,563,499 B1 * | 5/2003 | Waupotitsch et al. | | 345/420 |
| 6,999,073 B1 * | 2/2006 | Zwern et al. | | 345/420 |
| 7,027,054 B1 * | 4/2006 | Cheiky et al. | | 345/473 |
| 7,199,793 B2 * | 4/2007 | Oh et al. | | 345/419 |
| 7,536,030 B2 * | 5/2009 | Wang | G06K 9/00208 | 382/103 |
| 7,706,603 B2 * | 4/2010 | Najafi | G06K 9/3208 | 345/419 |
| 8,212,812 B2 * | 7/2012 | Tsin et al. | | 345/420 |
| 8,553,037 B2 * | 10/2013 | Smith et al. | | 345/473 |
| 8,570,343 B2 * | 10/2013 | Halstead | | 345/630 |
| 8,917,270 B2 * | 12/2014 | Sweeney et al. | | 345/420 |
| 8,947,423 B2 * | 2/2015 | Ocali et al. | | 345/419 |
| 8,970,690 B2 * | 3/2015 | Meier | G06T 7/0046 | 345/158 |
| 9,024,872 B2 * | 5/2015 | Takahama | G06F 3/012 | 345/156 |
| 9,058,687 B2 * | 6/2015 | Kruglick | | G06T 19/006 |

* cited by examiner

Primary Examiner — Phu K Nguyen (57) ABSTRACT

A method uses a collection of photographic images of an object taken from different viewing angles, along with a set of key geographic parameters for each frame of the photo images, to associate with the object's 3D modeling data, which can use for presenting high quality, photo-realistic 3D image in real time at a computing device. It also provides 3D geometry data for physical applications, which uses an automatic or a manual photo-taking system, and the imported 3D modeling data of the same object with the same hardware system or from an independent 3D geometry scanning system, composes these information into a complete package of files by a manual, semi-automatic or automatic software tool, and then to be presented with a viewing program with 3D environment. It can also be extended to the stereoscopic system and offers real time physical manipulation capabilities, the high quality, realistic visual effects.

14 Claims, 11 Drawing Sheets

METHOD USING 3D GEOMETRY DATA FOR VIRTUAL REALITY IMAGE PRESENTATION AND CONTROL IN 3D SPACE

FIELD OF THE INVENTION

This invention relates generally to the field of 3D photographic presentations. The techniques of virtual reality are used to show high quality photo images. It also takes the advantages of the 3D modeling technologies to provide geometry data for physical measurement or control, and will be used in the augmented reality applications. It can also extend to the stereoscopic display system for real time applications.

DESCRIPTION OF THE RELATED ART

Virtual reality uses a set of photo images to show the solid object viewing from different view angles. It offers high quality photo images for presentation applications. However, with limited number of photo frames, the viewing angles are limited to a discrete number of photo-taking positions and result with non-smooth animations. The photo images also consist no geometry data. They can not be aligned precisely in presentation, and can not be used in any physical related applications, for measurement or for control.

3D modeling is another approach of presenting a solid object. It has geometry information, can be used for physical applications including augmented reality. However, to obtain the precise geometry data and to present with texture mapping techniques for good quality presentation, it is very expensive in capturing the geometry data and to save the large amount of texture images. It is also difficult to do the photo-realistic rendering in real time with low performance personal computing devices.

There is a need to produce high image quality, photo-realistic virtual reality presentation for commercial applications, and there is a need to include the geometry information for physical augmented reality applications, especially for the desktop personal computers or mobile devices like tablet PCs and smart phones. To provide both the high quality viewing experience and the physical information, combining the merits of two different approaches of virtual reality and 3D modeling is a way to offer economic solutions and meet the quality requirement with the available computing devices. This invention achieves these goals and can be implemented with existing computing devices and mechanical systems.

SUMMARY OF THE INVENTION

In accordance with one aspect of the invention, a method of combining a set of photo frames with a set of the geometry information is described and a systematic way of presenting the 2D photos in a 3D space at a computing device's viewing window is described. The mathematical relationship among the image frame related parameters and the solid object's viewing transformation at the 3D presentation space is described.

In accordance with another aspect of the invention, a system consisting of a computer-control mechanical system to capture the photo images automatically at different view angles is described. A 3D geometry data scanning subsystem based on varieties of optical scanning hardware, or photo taking camera for extracting 3D geometry data by silhouette or referencing mat or stripes are described.

In accordance with another aspect of the invention, a software system consisting of a workstation, a storage system and a remote server and the client viewing device to implement the invention are described. A software program to compose the 2D photo frames with the scanned 3D geometry data to produce a set of controlling parameters manually or automatically is described. A software program to load the image and geometry data and do the viewing, measurement and control of the photo realistic solid object is described.

In accordance with another aspect of the invention, an extension of the hardware and software system to implement the stereoscopic display and control function is described.

BRIEF DESCRIPTION OF THE DRAWINGS

The present invention is better understood from the following description in conjunction with the accompanying drawing figures, although the detailed description may cover a more abstract system not limited by the visual figures.

The relationship among the true object, view window, the high resolution image and the 3D mesh, and the viewer FIG. 2: The Implementation for a 3D Virtual Reality System The mechanical image and 3D data capturing system, the composing computer, the data and program server and the client viewing devices FIG. 6: Embedding 3D Data System Diagram The frame-by-frame embedding of 3D geometry data and the 2D photos to assign the 6 degrees of freedom variables over to the images The required reference frames to do the automatic process

The user interface to adjust the 6 variables or their corresponding data to each of the frames (Three major adjusting procedures to be implemented)

FIG. 11: Extension to the Stereoscopic System The same system is used to take dual set of the photo images with frames compliant to the specifications for the stereoscopic display and control

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention. Besides, in all of the following embodiments, the same or similar components illustrated in different embodiments refer to the same symbols.

Figure 1:
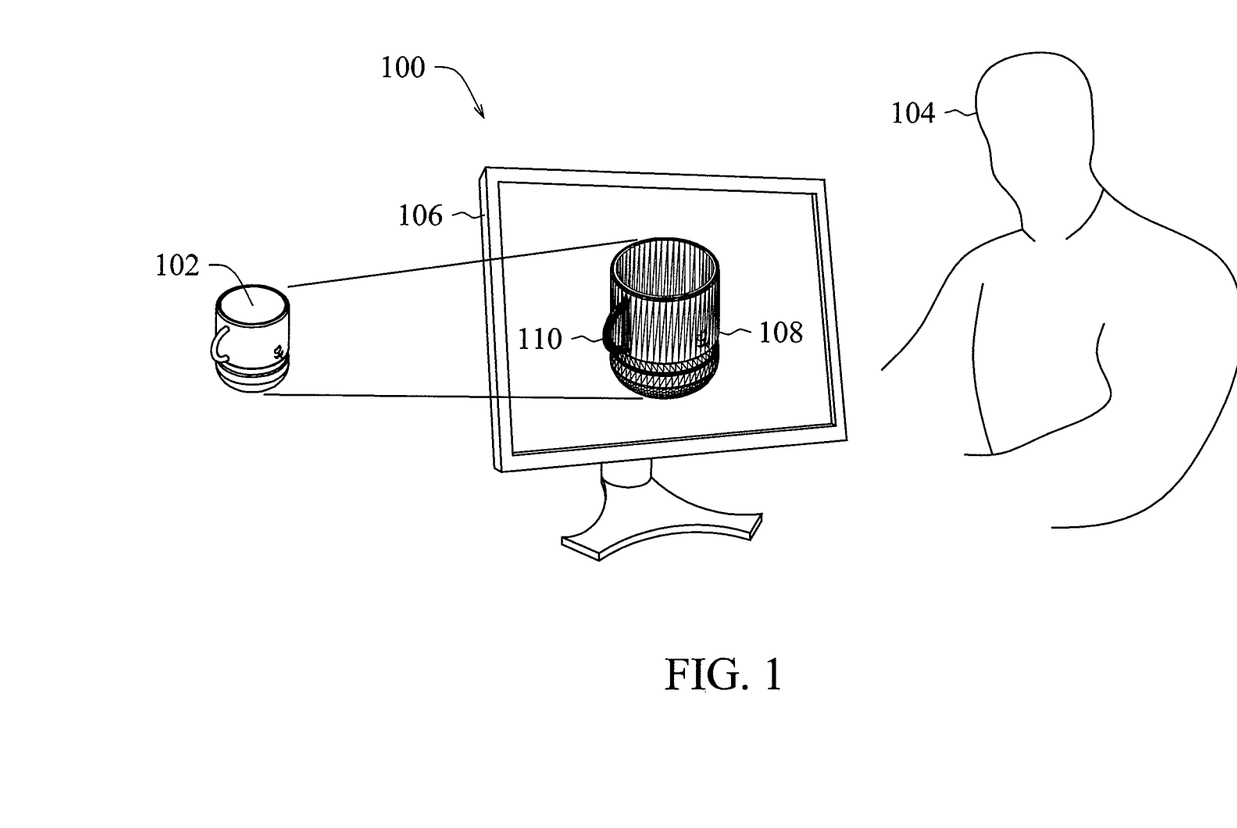
FIG. 1: Virtual Reality Image Presentation in 3D Space with 3D Modeling Data

With reference to FIG. 1, a method 100 is illustrated for a 2D photo image 108 with projected mapping on the 2D view window 106.

Match the 2D photo image 108 with 3D mesh 110 by using matrix transformation with six degrees of freedom for a solid object 102, or known as a solid object. Herein, the solid object is exemplarily illustrated as a mug, but can further be instead of any other solid object, such as a shoe, a light bulb and so on, in other non-illustrated embodiments. The geometry parameters generated from a 3D scanner can construct a 3D mesh 110.

The viewer 104 view and control the images interactively. 2D photos can be zoomed with scales s, panned by the screen coordinates (x, y) and rotated by ω angle, plus the (θ, φ) angles represented by a set of frames in each of the column, row positions.

Figure 2:
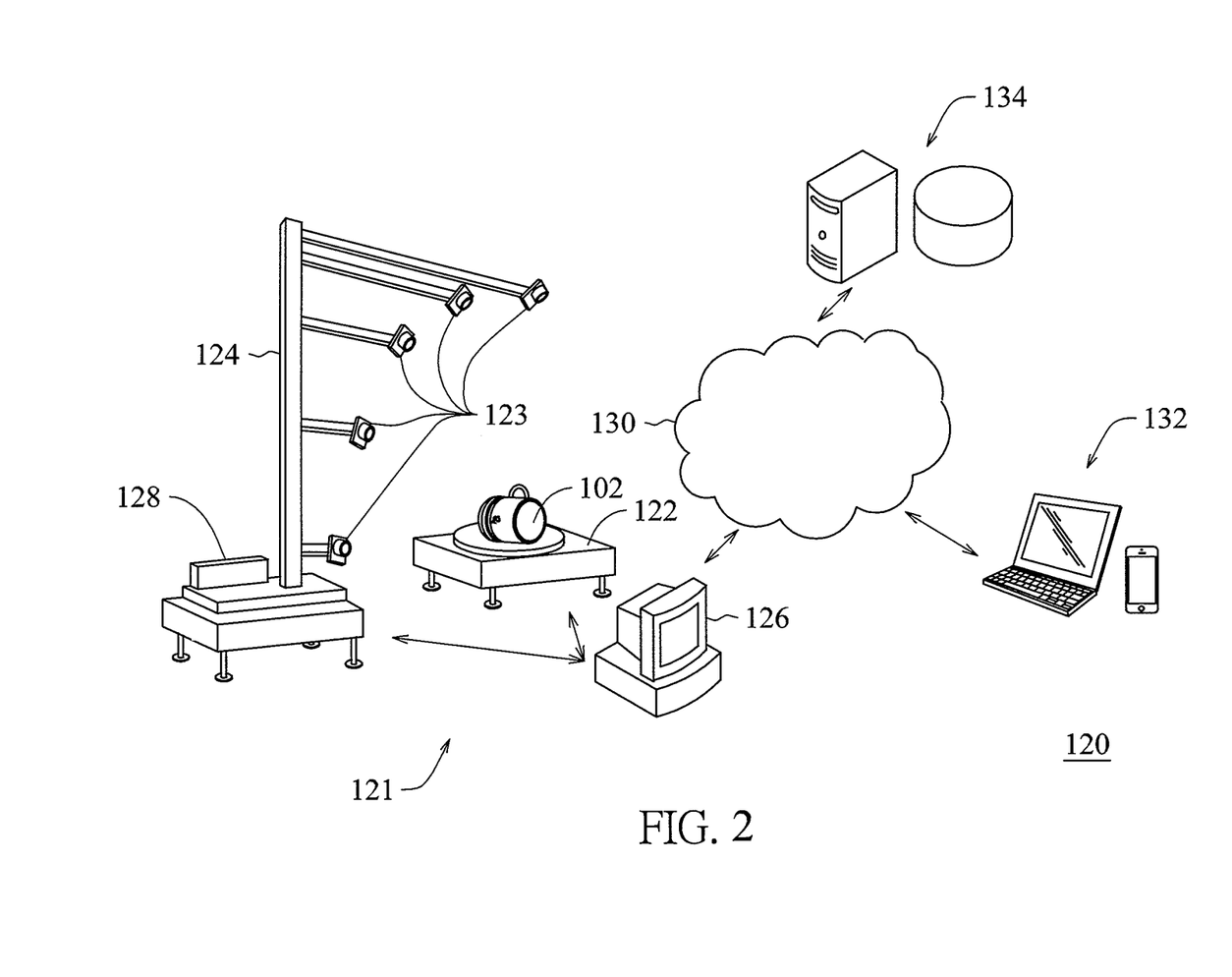

With reference to FIG. 2, an implementation 120 consists a Computer System 126 for mechanical control, image processing and data composition. A Photo capture System 121 consists of controlled rotating platform 122 and multi-arm 124 with cameras 123 moving at φ direction with lens zoom and tilting controlled to take photos at different (θ, φ) positions of the solid object 102.

A 3D scanner subsystem 128 (hardware or software enhanced) is included for capturing the 3D geometry data which can be constructed into a 3D mesh 110 (shown in FIG. 1). The scanner subsystem 128 can be replaced by cameras 123 if a photogrammetry with the silhouette of the 2D photo image 108 (shown in FIG. 1) is used for 3D modeling.

The Computer system 126 composes the 2D photo image 108 and 3D mesh 110 and sends them through Internet network 130 to a remote server and network storage system 134 linking to the Internet network 130.

An Internet connected client device 132, such as a PC, a tablet PC, a smart phone and so on, with viewing and control software is used to view and control the 2D photo image 108 and the 3D mesh 110 interactively.

Figure 3:
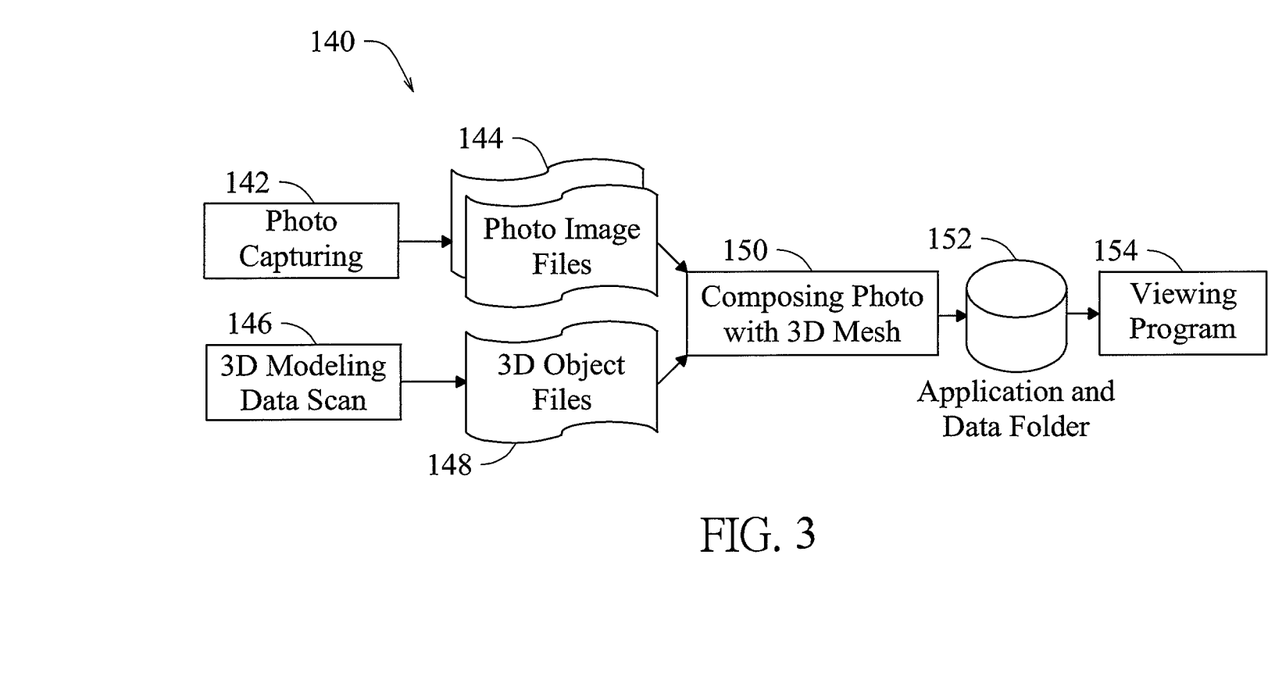
FIG. 3: Block Diagram of Data Capturing, Composing and Viewing System The process of capturing the data, the data to be saved, the composing program and the viewing program

With reference to FIG. 3, a block diagram 140 shows how the data were captured, processed and stored and then be consumed by the viewer at the client side.

In the block 142, 2D photo images are captured frame by frame at each of the view position, and they are preprocessed to optionally remove the image background, or compressed to JPEG format with hierarchical pixel resolution, transparency information, and then further saved in a 2D photo image file as shown in the block 144.

In the block 146, 3D geometry data are scanned at different view positions by, for example but not limited to, a 3D modeling data scan. But after filtering process to obtain the reliable data, they are further composed to a single set of mesh points with global coordinates system, such as a solid object file as shown in the block 148, or known as the 3D mesh.

In the block 150, a composing system will process the 2D photo image file and the solid object file, so as to comply the 3D geometry parameters of the 3D mesh with the corresponding 2D photo image parameters of the 2D photo images in the 2D image file for high image quality, photo-realistic virtual reality presentation and physical augmented reality applications, and then the matching of the 2D photo image file with the 3D mesh can be achieved. The composed results are saved at a file structure, such as an application and data folder as shown in the block 152, to save photo images at different resolution level, the solid object file and a profile to save the corresponding parameters with, for example but not limited to, xml file structure.

A viewing program as shown in the block 154 runs at a client device for decoding matching parameters and presenting the photo image in high quality interactively with the end user, and can additionally provide control and measurement of a 3D mesh for specific applications like augmented reality.

Figure 4:
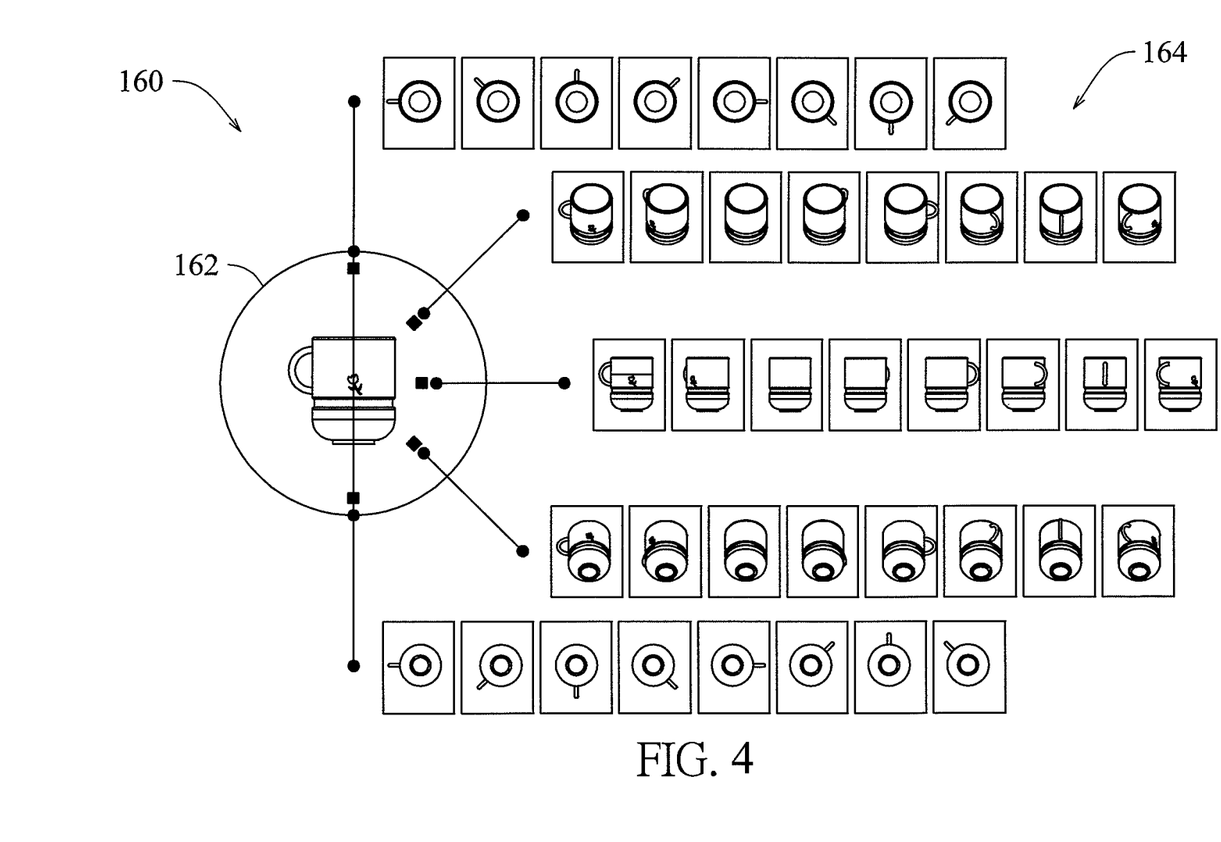
FIG. 4: Photo Image Capturing System The mechanical system of photo capturing and the workflow of image files produced

With reference to FIG. 4, a 2D photo capturing system 160 will take photo images of a solid object located in a computer controlled rotating mechanics 162.

The solid object will be viewed from different view angles, with at least a camera moving horizontally and vertically around the solid object with a fixed rotation axis. In the present embodiment, the solid object are exemplarily taken photos at the highest possible resolution by 5 different photo cameras with different view angles, for example the bottom side, the lower right side, the right side, the upper right side and the top side, and 8 different horizontal orientations relative to the solid object via the rotation of the computer controlled rotating mechanics 162, for example 0°, 45°, 90°, 135°, 180°, 225°, 270° and 315°, so as to form 40 different image files, and then the image files are saved frame by frame, with a specific naming convention 164. However, in other non-illustrated embodiments, it is also possible to take less or more photos for the solid object.

Note that the image files may be pre-processed to remove the unwanted background images, added the transparency information, or converted into hierarchical lower resolution and saved under a single root directory for future composing and viewing process.

Figure 5:
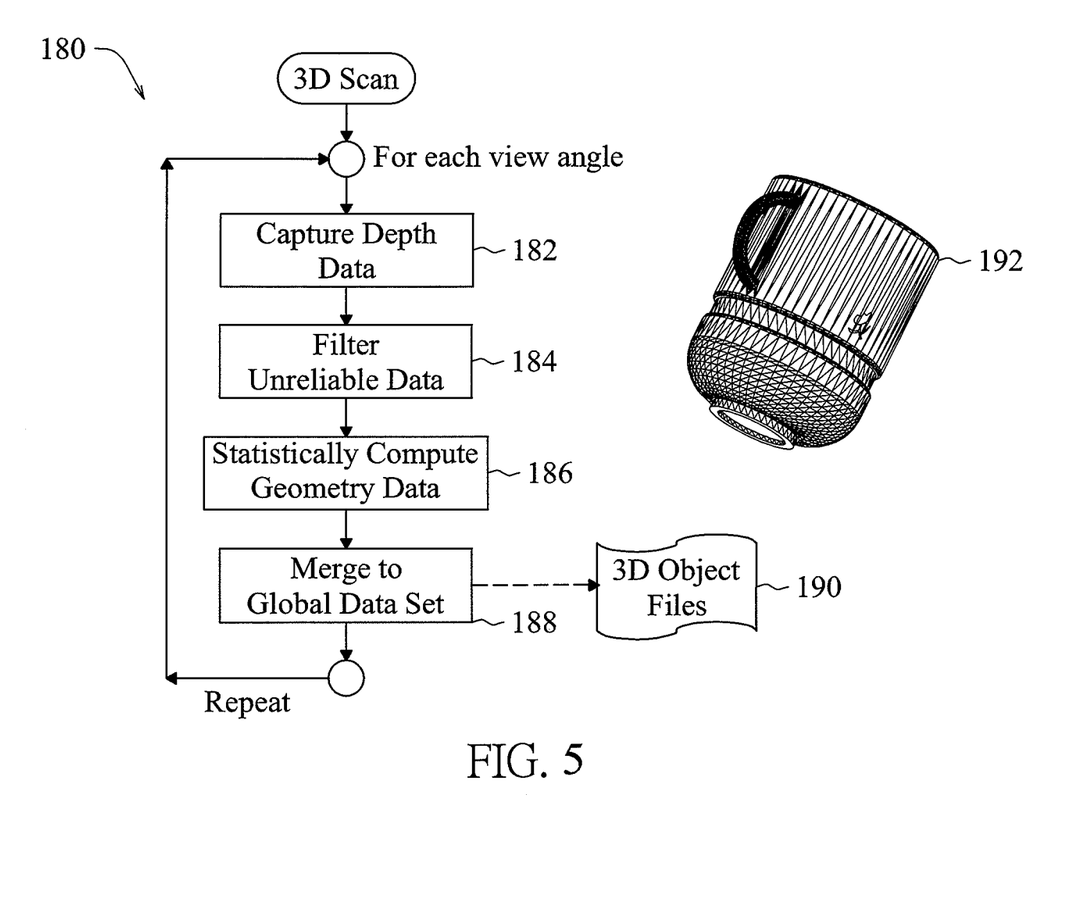
FIG. 5: 3D Modeling Data Capturing by Photo Camera or 3D Scanner The mechanical system of photo cameras or 3D scanner and the workflow of 3D geometry data produced

With reference to FIG. 5, a 3D geometry data capturing system 180 is used to obtain the geometry data of the solid object. It could be physically an independent system, or a subsystem of the photo capturing system as described in FIG. 4.

The 3D geometry data capturing system 180 will use a certain wavelength of visible optics camera, laser beam or invisible infrared and reflection capturing system, by getting the depth data 182 of each of the object geometry, or simply by taking the silhouette of the 2D photo image 108.

The 3D geometry data will be processed by measurement, with unreliable noise data removed first, such as a computing routine of filter unreliable data 184, and then compute the statistically more accurate data as the final node positions in the 3D global coordinate system, such as a routine of statistically compute geometry data 186.

The geometry data 186 will be compared and merged to a global data set 188 and save the accumulated in a standard solid object file 190.

With repeated measurement and data computations from many key positions to get the all necessary geometry data and parameters for the solid object, a final 3D mesh 192 from a plurality of 3D geometry parameters can be constructed.

Figure 6:
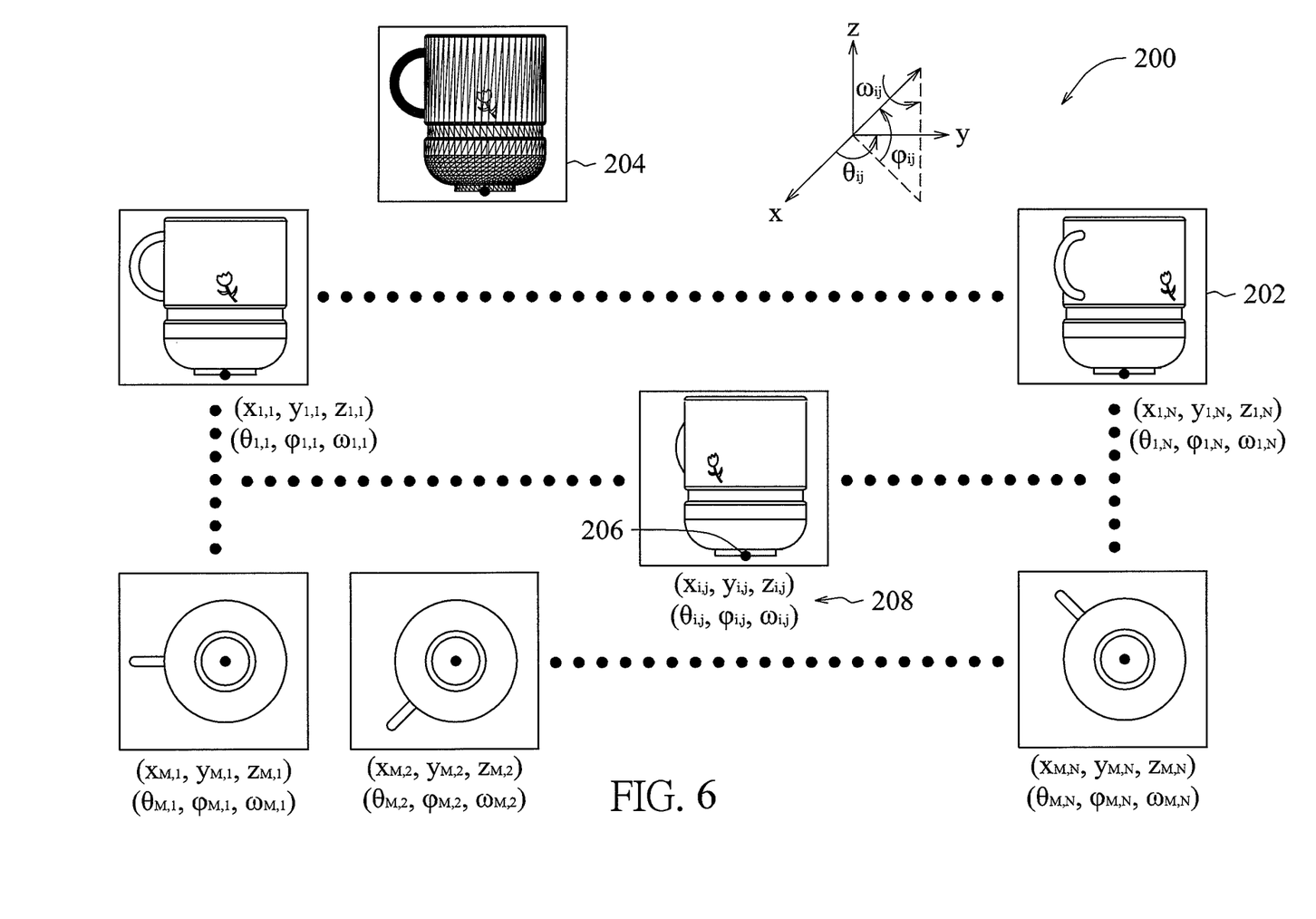

With reference to FIG. 6, a parameter matching system 200 will be generated for matching the 2D photos with the 3D geometry data.

As the photo images will be save in each of the photo frames 202 at each of the view angle, we have to match the 3D geometry parameters of the 3D mesh 204 with the corresponding 2D photo image parameters of the 2D photo images/frames 202, so they will be seen at the same presentation space.

As we know, any of a solid object can be represented by six degrees of freedom. We can chose a reference point at the 3D space (x, y, z) and the orientation angles of the object ($\theta, \phi, \omega$) to represent the correlated relation between a photo image and the 3D geometry data.

Therefore for each of the photo frame 202, we need to assign a set of the six parameters and tie them together for future presentation and control functions. In the present embodiment, for example but not limited to, the photo frame 202 can be named as Framei,j.jpg and composed of M columns and N rows, and the reference point 206 thereof can be denoted as ($x_{i,j}, y_{i,j}, z_{i,j}$). As a result, the six parameters of the 3D geometry data can be denoted as ($x_{0,0}, y_{0,0}, z_{0,0}, \theta_{0,0}, \phi_{0,0}, \omega_{0,0}$), while the six parameters of the photo frames 202 can be denoted as ($x_{i,j}, y_{i,j}, z_{i,j}, \theta_{i,j}, \phi_{i,j}, \omega_{i,j}$), wherein i=1, 2 ... M, and J=1, 2 ... N.

Figure 7:
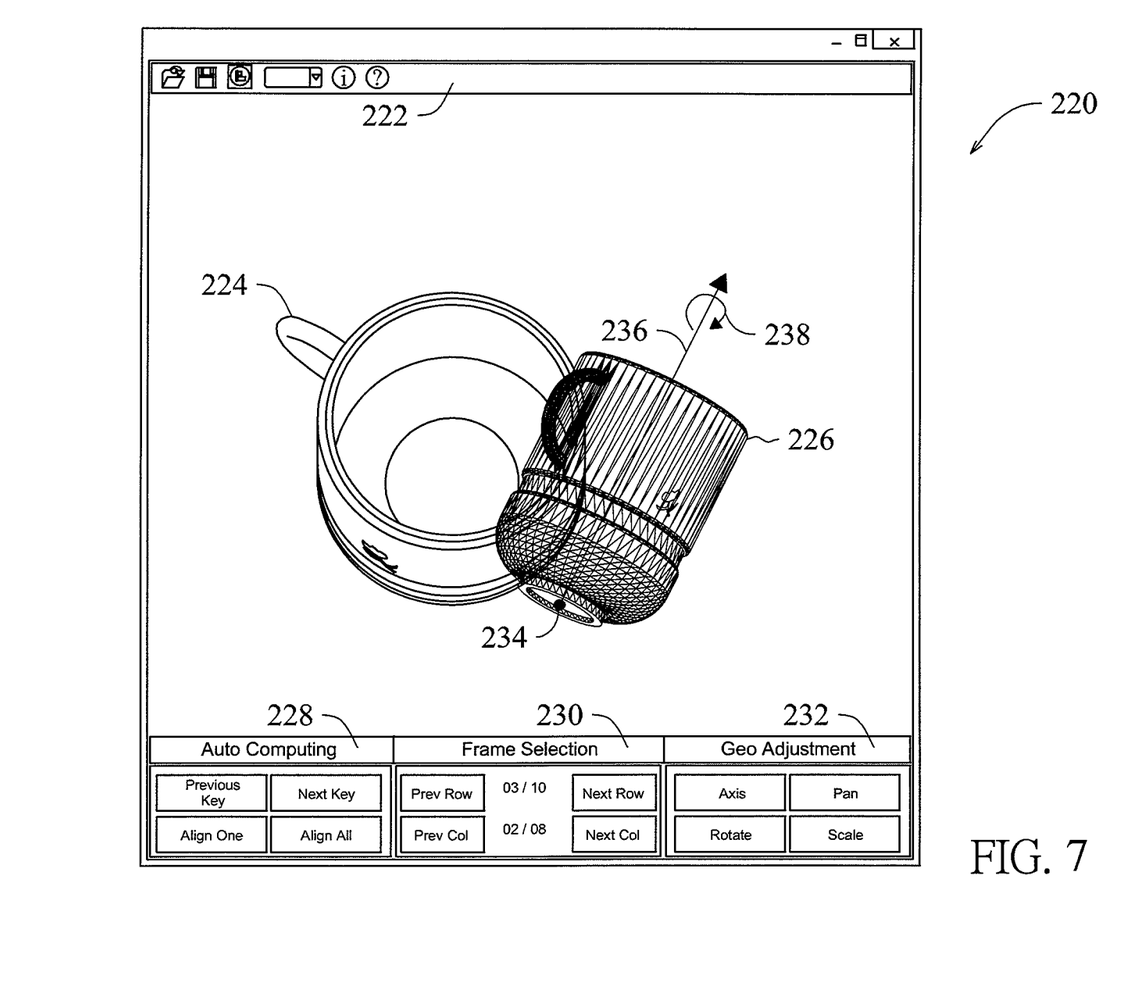
FIG. 7: Adjusting Frame Parameters by Scaling, Translating and Rotating The user interface to adjust the 6 variables or their corresponding data to each of the frames (Three major adjusting procedures to be implemented)

With reference to FIG. 7, a parameters matching software program 220 can be used to match these parameters with each of the photo frames.

The matching software program 220 has functions 222 to load the original 2D photo images and the 3D geometry parameters of the 3D mesh 226, and to save the composed data.

The matching software program 220 is designed to interact with the user by showing both the photo image 224 in any one of the 2D image frame as shown in the Frame Selection 230 and the 3D mesh 226.

Since the mouse cursor on a computer screen can move with only two degrees of freedom, the user can do the parameter matching manually. It can control the solid object body axis 236 by moving the tip of the axis for controlling the values of $\theta$ and/or $\phi$, and then by rotating the solid object body axis 236 for controlling the value of $\omega$.

The reference point 234 then can be panned on the screen to control the value x, y and then use the mouse wheel to control the size of the 3D mesh, which is equivalent to the scale of the object and hence the projected z location. It should be noted that, in this embodiment, all of the six parameters (x, y, z, $\theta, \phi, \omega$) are adjusted for manually matching the 2D image frame 224 with the 3D mesh 226. However, in other embodiments non-illustrated herein, it is certainly possible not to adjust all of the six parameters if unnecessary.

In contrast, the auto computing matching process 228 for helping to match the parameters is also provided, which can further match the parameters programmatically for a single frame, or for multiple frames, and will be described in the FIG. 8.

Please note that the manual matching processes 232 can further be replaced by direct computation by using the auto computing matching processes 228 while doing the capturing process altogether. The automatically matching of a 2D photo image file with a 3D mesh is programmatically automatic matching the parameters of the 2D photo images with the 3D geometry parameters of the 3D mesh while a 3D geometry scan mechanism can provide the parameters relations between the 2D photo images and the 3D mesh.

Figure 8:
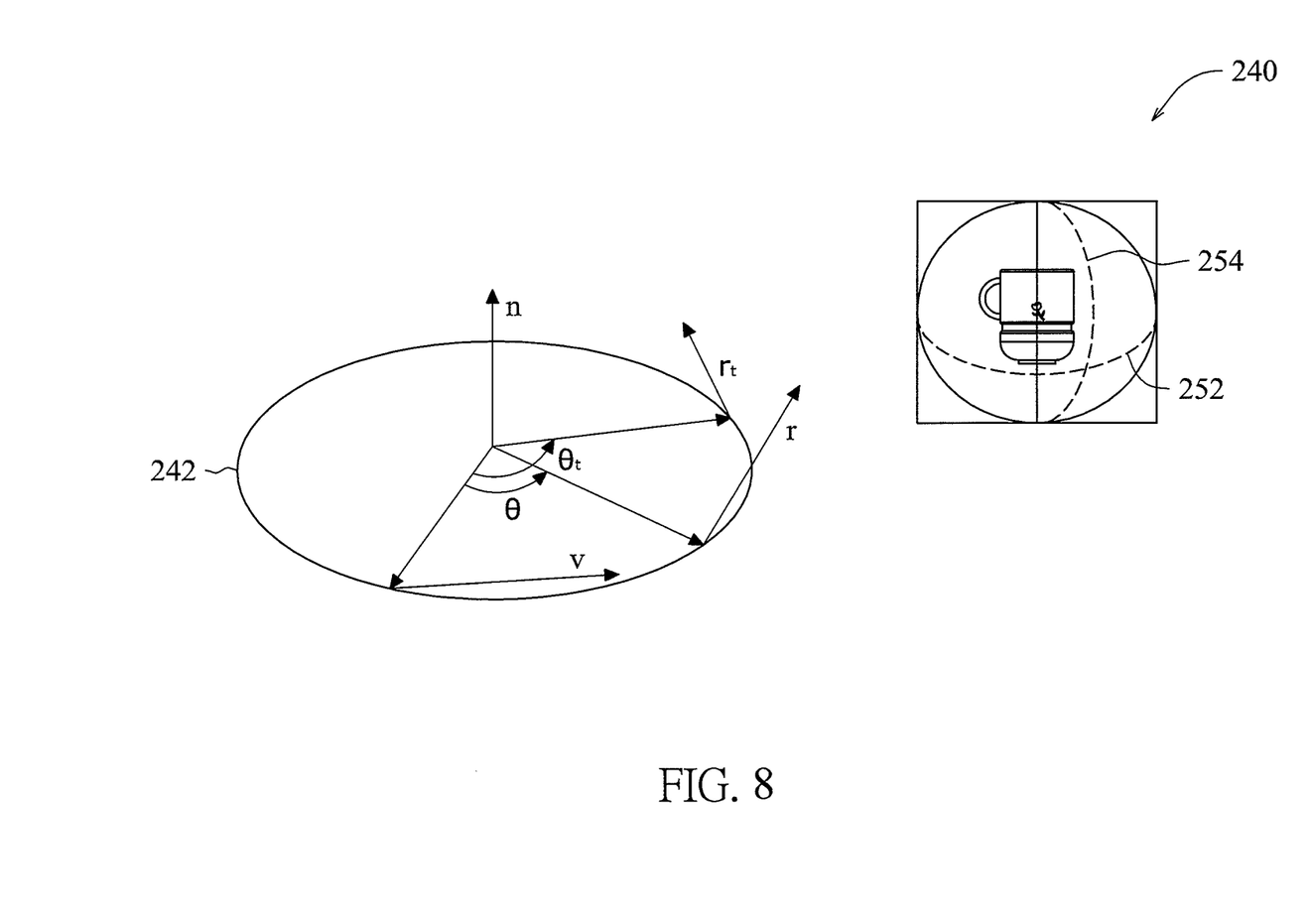
FIG. 8: Automatic Parameters Generating for All Frames

With reference to FIG. 8, a computation scheme 240 is developed to generate the parameters matching for all viewing angles at each of the photo frame automatically.

By applying the Quaternion technology, any of the 3D vector v, which representing the reference point and the body axis, can be calculated to get the new vector r in the 3D space after rotation around a rotating unit axis n with a rotating angle $\theta$.

Therefore we can use any of the two frames at the same row with known rotating angles, by using the parameters to calculate the rotating unit axis n. Once it is known, any of other reference point and the body axis in each of the frames at the same row 242 can be calculated, and therefore automatically matching the parameters.

The same computation can be done on the vertical direction for the image frames at a single column 254 but different rows 252. Duplicating the same process, all the frames can be calculated.

Theoretically, we need only three manually matched frames to calculate the rotating unit axis in horizontal and vertical directions, and save tremendously the man power to find out the matching parameters. However, with the practical implementation, the rotating trajectory of the camera may not located at a perfect circular path and the tilting angle and zoom lens may project the photo images in a non-linear way, more manually matched frames of 5 or 7 may be required to get a more reliable data. A visual adjustment to review the matching computation is also offered to do the fine adjustment.

Figure 9:
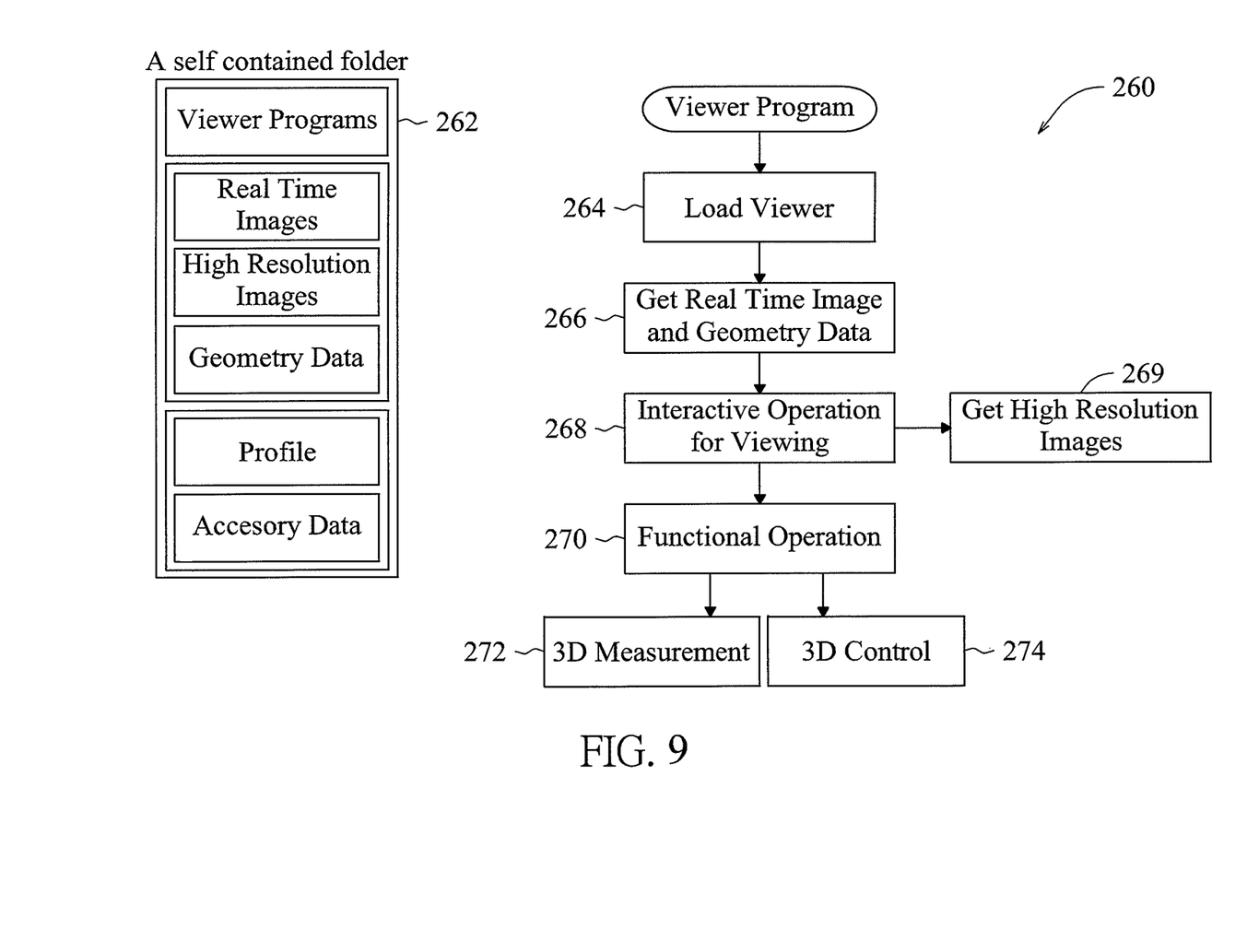
FIG. 9: File System for Imaging, 3D Data and Profiling, and Flow Chart of Viewing Program The data file generated and the corresponding imaging and geometry data files The viewing program flow chart to show the image and data loading

With reference to FIG. 9, a file system at the Internet server 260 is constructed to provide the end user a viewing mechanism to see high resolution photo images plus the 3D geometry data at his client device.

All the viewer programs, image data in real time and in high resolution, the geometry data, accessory data and the presentation profile, are saved under a root directory 262 to ensure there's no cross domain access problem.

The viewer program, accessed by the end user, will load all the necessary program routines, named Viewer herein, as shown in the block 264, and then get the real time image and geometry data of 3D mesh automatically, as shown in the block 266. Next, as shown in the block 268, the interactive operation for viewing high resolution image and the 3D mesh is available, so as to get high resolution images as shown in the block 269. Additionally, the functional operation as shown in the block 270 will further be available, depending on the augmented reality applications, for necessary 3D measurement as shown in the block 272 or 3D control functions as shown in the block 274.

The program can be implemented on a client device with 3D operating environment like OpenGL or WebGL, or any other 3D environments.

Figure 10:
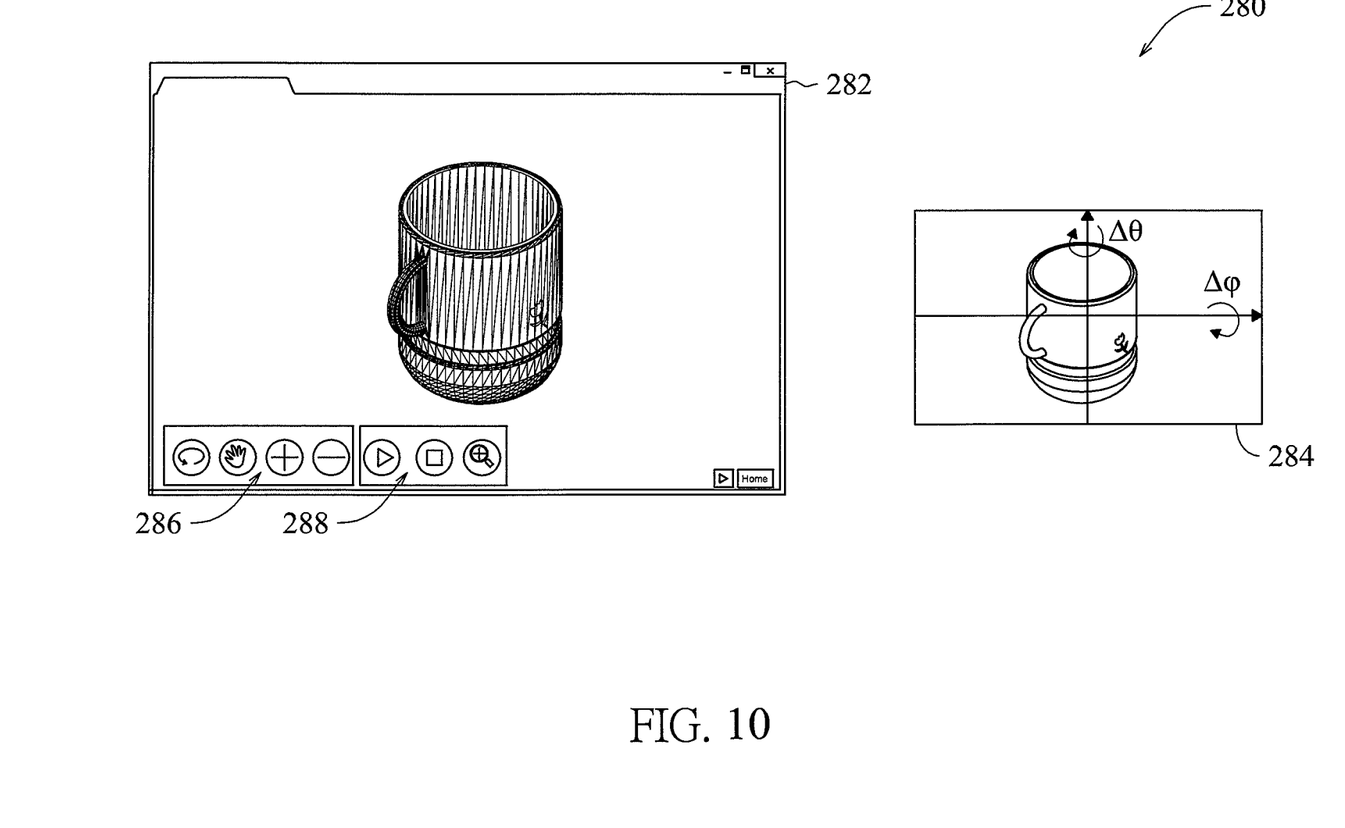
FIG. 10: Viewing Program with 3D Presentation and Control The viewing program functions and controls for the end user The data resource structure for high resolution presentation and morphing techniques for smooth operation

With reference to FIG. 10, a client side viewing program 280 is developed to implement the functions described in FIG. 9.

The viewing program 280 can be a WebGL-enabled browser-based HTML5 viewing program for the Windows platform for the Computer system 126 (shown in FIG. 2), such as a desktop computer, a mobile device or any device capable of showing the operation window 282, or a native program with OpenGL ES enabled mobile device.

The program has operational buttons 286 to perform zoom, pan and rotate functions of viewing the photo image interactively, it has a slider controller to view either photo images in high quality, or to see the wire frame of the 3D model and even viewing both of them in a different transparency way.

To show the smoothness of the 2D photo images in the 3D space, it can also perform angular morphing of the 2D photo image(s) 284 by varying an angle $0<\Delta\theta<\theta_{increment}$ and/or an angle $0<\Delta\phi<\phi_{increment}$.

Depending on the application, it also provides functioning buttons 288 to perform the measurement and application control, and any other functions required.

Figure 11:
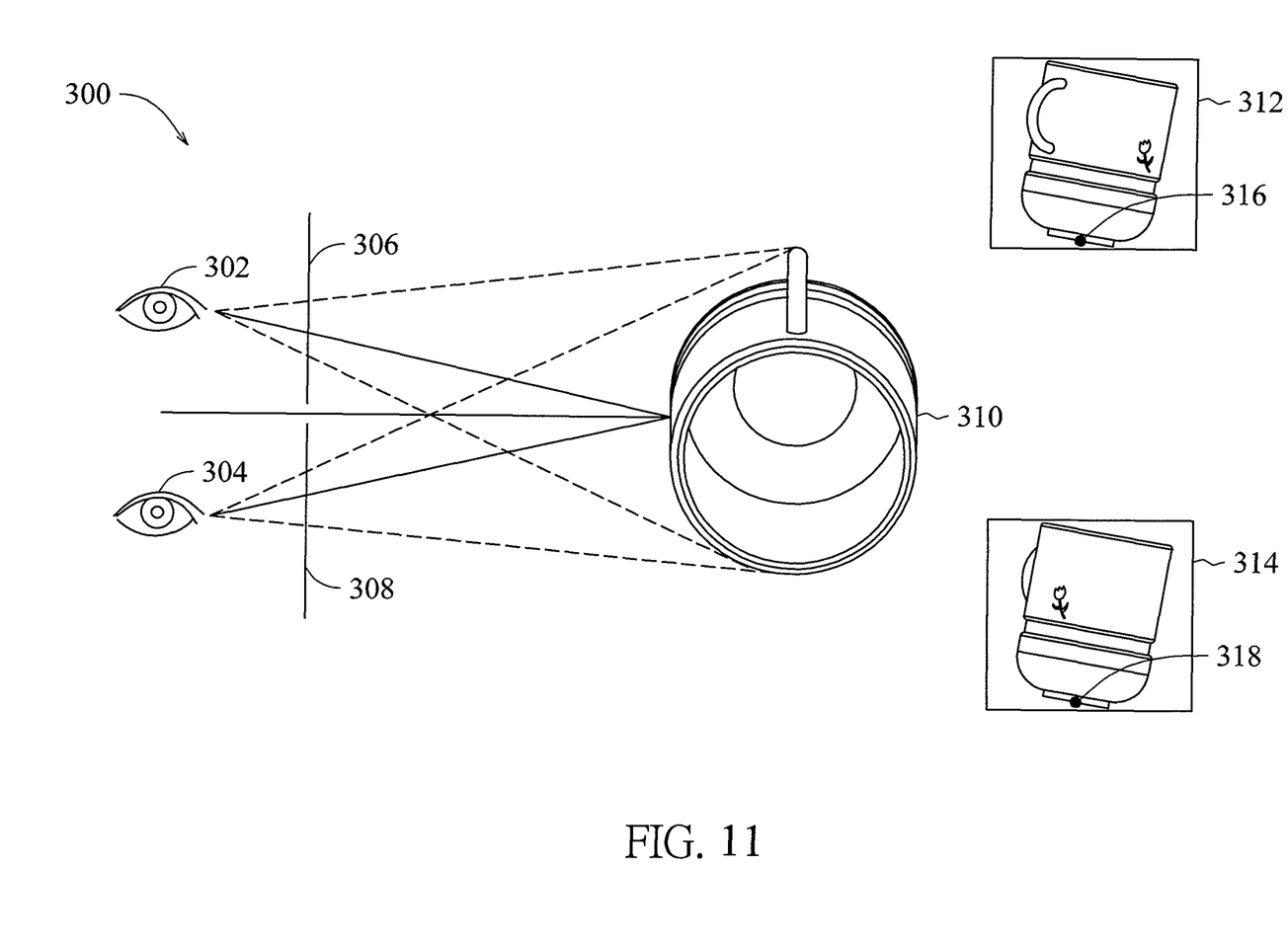

With reference to FIG. 11, the system can also extend to a stereoscopic system 300 to view the object in a more realistic feeling due to the human being's eyes perception.

The viewing windows will be two separate ones for both left stereogram 306 and right stereogram 308, proving images for left eye 302 and right eye 304, respectively.

The two set of the images and the matching parameters are taken in considering the view angle difference for the same object 310. There will be independently set of left one 312 and right one 314. In the present embodiment, for example but not limited to, the left one 312 and the right one 314 can be respectively named as FrameLi,j.jpg and FrameRi,j.jpg, and the reference points 316 and 318 thereof can be respectively denoted as $(x_{i,j}, y_{i,j}, z_{i,j})_R$ and $(x_{i,j}, y_{i,j}, z_{i,j})_L$. As a result, the six parameters of the 3D geometry data relative to the left one 312 and the right one 314 can be respectively denoted as $(x_{0,0}, y_{0,0}, z_{0,0}, \theta_{0,0}, \phi_{0,0}, \omega_{0,0})_R$ and $(x_{0,0}, y_{0,0}, z_{0,0}, \theta_{0,0}, \phi_{0,0}, \omega_{0,0})_L$, while the six parameters of the left one 312 and the right one 314 are respectively denoted as $(x_{i,j}, y_{i,j}, z_{i,j}, \theta_{i,j}, \phi_{i,j}, \omega_{i,j})_R$ and $(x_{i,j}, y_{i,j}, z_{i,j}, \theta_{i,j}, \phi_{i,j}, \omega_{i,j})_L$, wherein i=1, 2 . . . M, and J=1, 2 . . . N.

However, it is also possible to use a single set of the 2D photos with different column index for the same row of the images. It will not be very accurate in the viewing angle and distance simulation, but will offer sufficient depth feeling for the average viewers.

The view windows can be applied to TV's, movie screens, or even, new wearable gadgets with view glasses.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of matching a 2D photo image file with a 3D mesh by using matrix transformation with six degrees of freedom for a solid object on the 2D view window, wherein 3D geometry parameters of the 3D mesh are complied with 2D photo image parameters of the 2D image file for high image quality, photo-realistic virtual reality presentation and physical augmented reality applications, and the matrix transformation with six degrees of freedom for the solid object is done manually by at least one of the following steps:
   manually moving the tip of the axis for controlling the values of θ;
   manually moving the tip of the axis for controlling the values of φ;
   manually rotating a body axis of the solid object for controlling the value of ω; and
   scaling a size of the 3D mesh for matching with the 2D photo image parameters being selected from the 2D photo image file until the whole set of the 2D photo image file has been used up, wherein no less than three 2D photo images in the 2D photo image file are selected manually from the body axis in horizontal and vertical directions with calculation assisted.

2. The method of matching a 2D photo image file with a 3D mesh as claimed in claim 1, wherein 2D photo images in the 2D photo image file is optionally processed at least one of the following:
   removing image backgrounds thereof; compressed to JPEG format with hierarchical pixel resolution, transparency information; and saved in the 2D photo image file.

3. The method of matching a 2D photo image file with a 3D mesh as claimed in claim 1, wherein the 3D geometry parameters can be generated from a certain wavelength of visible optics camera, laser beam or invisible infrared and reflection capturing system, by getting the silhouette of 2D photo images in the 2D photo image file, or the depth data of each of object geometry of the solid object.

4. The method of matching a 2D photo image file with a 3D mesh as claimed in claim 1, wherein the high image quality, photo-realistic virtual reality presentation is a file system at the internet server constructed to provide an end user a viewing mechanism to see high resolution photo images and the 3D mesh, and the physical augmented reality applications are for 3D measurement or 3D control functions.

5. The method of matching a 2D photo image file with a 3D mesh as claimed in claim 4, wherein the high resolution photo images and the 3D mesh are viewed together in a different transparency way.

6. The method of matching a 2D photo image file with a 3D mesh as claimed in claim 4, wherein the high image quality, photo-realistic virtual reality presentation further extends to a stereoscopic system with viewing window of left stereogram and right stereogram for left eye and right eye, respectively.

7. The method of matching a 2D photo image file with a 3D mesh as claimed in claim 4, wherein the high image quality, photo-realistic virtual reality presentation further extends to show a smoothness of 2D photo images in the 2D photo image file in a 3D space through angular morphing of the 2D photo images in at least one of a θ direction and a φ direction.

8. A method of matching a 2D photo image file with a 3D mesh by using matrix transformation with six degrees of freedom for a solid object on the 2D view window, wherein 3D geometry parameters of the 3D mesh are complied with 2D photo image parameters of the 2D image file for high image quality, photo-realistic virtual reality presentation and physical augmented reality applications, and the matrix transformation with six degrees of freedom for the solid object is done automatically by programmatically automatic matching of the 2D photo image parameters with the 3D geometry parameters while a 3D geometry scan mechanism provides parameter relations between 2D photo images in the 2D photo image file and the 3D mesh.

9. The method of matching a 2D photo image file with a 3D mesh as claimed in claim 8, wherein 2D photo images in the 2D photo image file is optionally processed at least one of the following:
   removing image backgrounds thereof; compressed to JPEG format with hierarchical pixel resolution, transparency information; and saved in the 2D photo image file.

10. The method of matching a 2D photo image file with a 3D mesh as claimed in claim 8, wherein the 3D geometry parameters can be generated from a certain wavelength of visible optics camera, laser beam or invisible infrared and reflection capturing system, by getting the silhouette of 2D photo images in the 2D photo image file, or the depth data of each of object geometry of the solid object.

11. The method of matching a 2D photo image file with a 3D mesh as claimed in claim 8, wherein the high image quality, photo-realistic virtual reality presentation is a file system at the internet server constructed to provide an end user a viewing mechanism to see high resolution photo images and the 3D mesh, and the physical augmented reality applications are for 3D measurement or 3D control functions.

12. The method of matching a 2D photo image file with a 3D mesh as claimed in claim 11, wherein the high resolution photo images and the 3D mesh are viewed together in a different transparency way.

13. The method of matching a 2D photo image file with a 3D mesh as claimed in claim 11, wherein the high image quality, photo-realistic virtual reality presentation further extends to a stereoscopic system with viewing window of left stereogram and right stereogram for left eye and right eye, respectively.

14. The method of matching a 2D photo image file with a 3D mesh as claimed in claim 11, wherein the high image quality, photo-realistic virtual reality presentation further extends to show a smoothness of 2D photo images in the 2D photo image file in a 3D space through angular morphing of the 2D photo images in at least one of a $\theta$ direction and a $\phi$ direction.

\* \* \* \* \*